(12) United States Patent
Siddappa et al.

(10) Patent No.: US 10,979,504 B2
(45) Date of Patent: *Apr. 13, 2021

(54) DISTRIBUTED STORAGE RESOURCE MANAGEMENT IN A HYPER CONVERGED INFRASTRUCTURE

(71) Applicant: VMware, Inc., Palo Alto, CA (US)

(72) Inventors: Gireesha Udagani Siddappa, Bangalore (IN); Samdeep Nayak, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,912

(22) Filed: Oct. 7, 2019

(65) Prior Publication Data

US 2020/0036791 A1 Jan. 30, 2020

Related U.S. Application Data

(63) Continuation of application No. 15/587,439, filed on May 5, 2017, now Pat. No. 10,462,221.

(30) Foreign Application Priority Data

Feb. 25, 2017 (IN) .............................. 201741006740

(51) Int. Cl.
*G06F 15/173* (2006.01)
*H04L 29/08* (2006.01)

(52) U.S. Cl.
CPC ...... *H04L 67/1097* (2013.01); *H04L 67/1002* (2013.01); *H04L 67/1012* (2013.01)

(58) Field of Classification Search
USPC ......................... 709/226, 223, 225, 211, 202
See application file for complete search history.

(56) References Cited

U.S. PATENT DOCUMENTS

| 8,255,915 B1 | 8/2012 | Blanding et al. |
| 8,724,848 B1 | 5/2014 | Heath et al. |
| 9,553,771 B1 | 1/2017 | McKenna et al. |
| 9,929,780 B2 | 3/2018 | Abbondanzio et al. |
| 10,027,596 B1 | 7/2018 | Harwood |
| 10,083,051 B1 | 9/2018 | Mahapatra et al. |
| 2006/0184349 A1 | 8/2006 | Goud et al. |

(Continued)

OTHER PUBLICATIONS

Kovar, Software-Defined Data Centers: Should You Jump on the Bandwagon?, May 13, 2013, pp. 2, 4-6.

*Primary Examiner* — Lan Dai T Truong (57) ABSTRACT

A distributed storage resource management in a hyper converged infrastructure is created. The system accesses a virtualized infrastructure comprising a plurality of host machines, each of said plurality of host machines having resources, the resources comprising: a central processing unit (CPU), a memory, and a storage, each of the plurality of host machines communicatively coupled with one or more virtual machines. The resources in each of the host machines are disaggregated. The resources are aggregated based on a nature of the resource into a common pool of shared resources. A request is received for a workload application having a resource requirement. The resource requirement of the workload application is matched with resources in the common pool of shared resources. The matched resources in the common pool of shared resources are assigned to the workload application.

17 Claims, 8 Drawing Sheets

(56) References Cited

U.S. PATENT DOCUMENTS

| | | |
|---|---|---|
| 2007/0143629 A1 | 6/2007 | Hardjono et al. |
| 2008/0271034 A1 | 10/2008 | Miyata |
| 2008/0275975 A1 | 11/2008 | Pandey et al. |
| 2010/0101339 A1 | 4/2010 | Tatsutani et al. |
| 2011/0055588 A1 | 3/2011 | Dehaan |
| 2011/0276951 A1 | 11/2011 | Jain |
| 2011/0298607 A1 | 12/2011 | Priyantha et al. |
| 2012/0137289 A1 | 5/2012 | Nolterieke et al. |
| 2012/0180055 A1 | 7/2012 | Brech et al. |
| 2013/0219068 A1 | 8/2013 | Ballani et al. |
| 2013/0223684 A1 | 8/2013 | Townend et al. |
| 2014/0006862 A1 | 1/2014 | Jain et al. |
| 2014/0055248 A1 | 2/2014 | Hammelbacher |
| 2014/0298091 A1 | 10/2014 | Carlen et al. |
| 2015/0009013 A1 | 1/2015 | Cartwright et al. |
| 2015/0067294 A1 | 3/2015 | Hu et al. |
| 2015/0098608 A1 | 4/2015 | Hintermeister et al. |
| 2015/0234617 A1 | 8/2015 | Li et al. |
| 2015/0341220 A1 | 11/2015 | Sikand et al. |
| 2015/0370583 A1 | 12/2015 | Shah et al. |
| 2015/0370587 A1 | 12/2015 | Kureha et al. |
| 2016/0299957 A1 | 10/2016 | A. C. et al. |
| 2016/0337446 A1 | 11/2016 | Abali et al. |
| 2016/0380815 A1 | 12/2016 | Agarwal et al. |
| 2017/0255494 A1 | 9/2017 | Bartfai-Walcott et al. |
| 2017/0286252 A1 | 10/2017 | Illikkal et al. |
| 2017/0293447 A1 | 10/2017 | Bivens et al. |
| 2018/0248949 A1 | 8/2018 | Siddappa et al. |
| 2018/0295036 A1 | 10/2018 | Krishnamurthy et al. |
| 2019/0235902 A1 | 8/2019 | Wei et al. |
| 2019/0278663 A1 | 9/2019 | Mehta et al. |

DISTRIBUTED STORAGE RESOURCE MANAGEMENT IN A HYPER CONVERGED INFRASTRUCTURE

RELATED APPLICATION

This application claims priority to and is a continuation of the co-pending U.S. patent application Ser. No. 15/587,439, filed on May 5, 2017, entitled "DISTRIBUTED STORAGE RESOURCE MANAGEMENT IN A HYPER CONVERGED INFRASTRUCTURE", by Gireesha Udagani, et al., which is herein incorporated by reference in its entirety and assigned to the assignee of the present application.

Application with U.S. Ser. No. 15/587,439 claims benefit under 35 U.S.C. 119(a)-(d) to Foreign Application No. 201741006740 filed in India entitled "DISTRIBUTED STORAGE RESOURCE MANAGEMENT IN A HYPER CONVERGED INFRASTRUCTURE", on Feb. 25, 2017, by VMware, Inc., which is herein incorporated in its entirety by reference for all purposes.

BACKGROUND

A software-defined data center (SDDC) is hardware agnostic and is designed to work with hardware from various different vendors. Applications on SDDC run on, logically defined resources for which hardware is abstracted away. VMware unified SDDC platform is an integrated software suite that powers a new class of integrated systems designed to provide the easiest path to a VMware EVO SDDC private cloud. The systems are turnkey solutions that combine qualified hardware (compute, networking, storage) with integrated VMware software to deliver a complete SDDC in a box. Based on modular hyper converged infrastructure, the VMware EVO SDDC systems deliver elastic, scalable, and high performing infrastructure capable of addressing the needs of large-scale VMware EVO SDDC deployments in a variety of use cases, including virtual infrastructure, Infrastructure-as-a-Service (IAAS), and virtual desktop infrastructure (VDI).

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "promoting," "integrating," "emphasizing," "providing," "monitoring," "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview

VMware EVO SDDC is hardware agnostic and is designed to work with hardware from various different vendors. Applications on VMware EVO SDDC run on logically defined resources for which hardware is abstracted away. However, presently creating IAAS or another workload, the number of servers or nodes required to build the workload is based on the maximum required capacity of the CPU, memory and storage. One example of workload resource requirements is a CPU capacity 6 GHz, memory capacity 2 TB, and storage capacity of 10 TB.

In one embodiment, each server in the rack has a CPU capacity of 2 GHz, a memory capacity of 1 TB and a storage capacity of 3 TB. As such, the workload build without utilizing the technology described herein would require 4 servers to be assigned to the workload. Thus, the best fit workload of four servers would have a CPU capacity of 8 GHz, a memory capacity of 4 TB and a storage capacity of 12 TB which is significantly more CPU and memory than actually required by the workload specifications, but which becomes necessary to meet the storage requirements of the workload build.

The problem can be further realized when blade systems are introduced or being used by the workload. For example, a blade system may have a good amount of memory and/or CPU, but minimal storage aspects, e.g., 1 TB or could even rely on external or shared storage models for capacity needs. Thus, the above workload would need to utilize 8 blades to meet the minimum storage requirements. However, using 8 blades would likely provide CPU and Memory aspects of the workload, which would be significantly greater than what was required by the workload.

The following discussion provides a novel way of reducing the number of servers or blades for the workload while meeting all of the workload's maximum required capacity. By utilizing aspects of the following discussion, the workload's required capacity for memory, storage, and CPU without requiring the workload to include unnecessary memory, storage or CPU. The following discussion will use storage aspects for purposes of clarity, however, it should be understood that the same procedure described herein can be used for any of the other resources of the rack. Moreover, embodiments are also well suited to performing the procedures outlined herein on a plurality of the available rack resources. For example, both CPU and storage, memory and storage, CPU and memory, or even all three of CPU, memory, and storage.

In general, one embodiment will pool all the storage resources in the physical rack. Based on the demand allocates the storage capacity to required workload domain (WLD) on loaned basis. In one embodiment, workload domain refers to a cluster of compute, storage, and network that provides uniform characteristics such as performance, availability, security and isolation to applications.

Figure 1A:
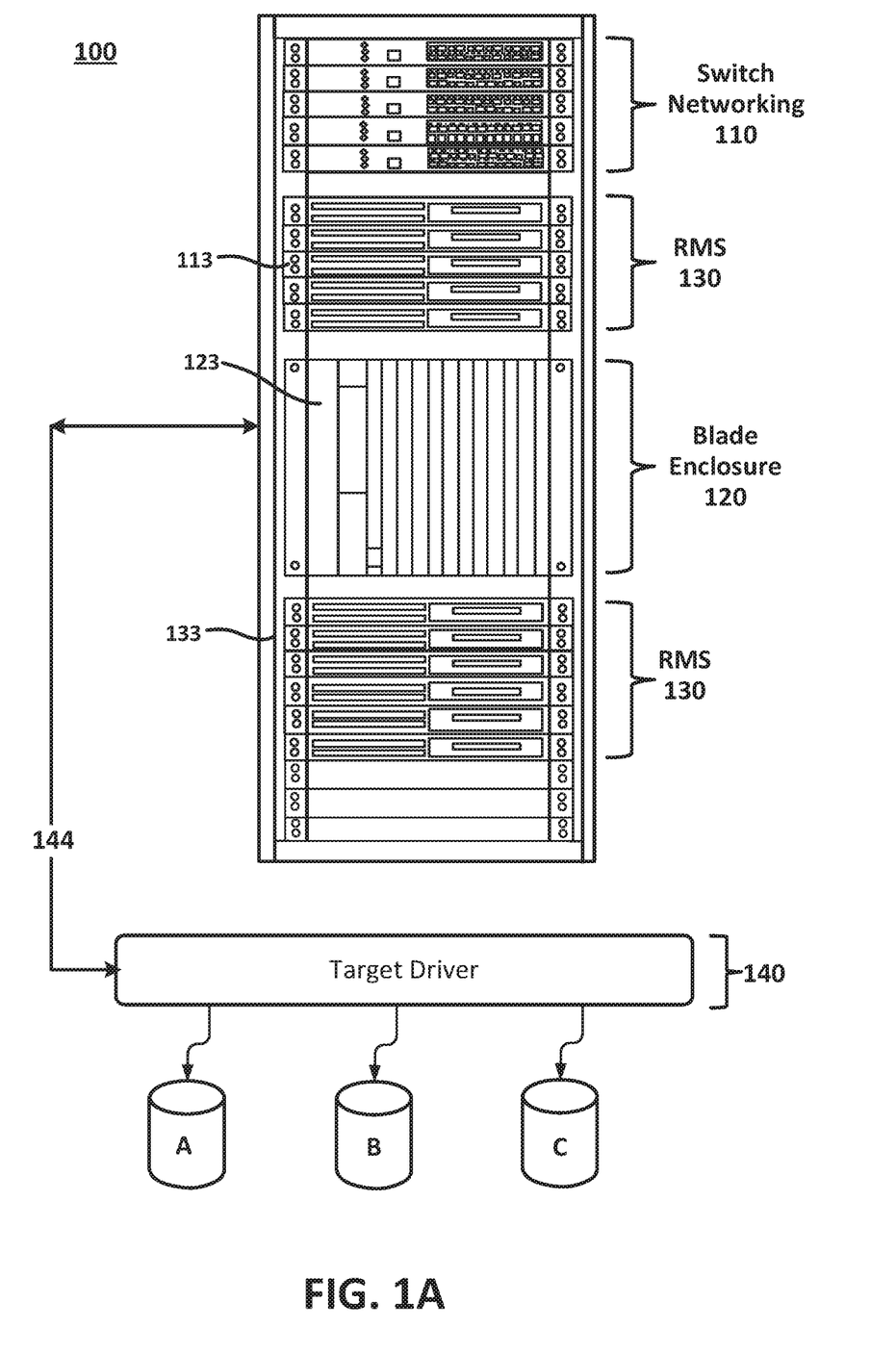
FIG. 1A depicts a block diagram of a VMware EVO SDDC rack, according to one embodiment.

With reference now to FIG. 1A, a block diagram of a VMware EVO SDDC rack 100 (hereinafter SDDC rack 100) is shown in accordance with an embodiment. In one embodiment, SDDC rack 100 is a combination of software and hardware that are stored on a rack. However, the technology is also suited to one or more components of SDDC rack 100 being stored in locations other than the rack. Moreover, although there are some specific organizations of SDDC rack 100 discussed herein and contained in the figures, the technology may be well suited to different arrangements, organization, or the like. In general, SDDC rack 100 utilizes the concepts of virtualization across all data center resources and services (compute, storage, and networking) to deliver a fully automated, zero-downtime infrastructure that can transparently include different hardware over time. SDDC rack 100 provides abstraction, pooling, and automation of the compute/storage/networking infrastructure services. Under SDDC rack 100, policy-driven automation will enable provisioning and ongoing management of both physical and logical compute, storage, and network services. In FIG. 1A, SDDC rack 100 includes switch networking 110, blade enclosure 120, rack server or rackmount servers (RMS) 130, and SCSI target 140.

Switching network 110 may also include management 113 capabilities that are part of a dedicated management infrastructure running in each physical rack. The management 113 capabilities include aspects such as inventory management, security management, performance management, and availability management.

Inventory management refers to aspects such as a virtual resource manager (VRM), and the like. VRM is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, the VRM will automatically discover new devices and processes hardware events (e.g., alarms, sensor data threshold triggers) and state changes. VRM then exposes events and state changes to the rest of the SDDC rack 100 in a hardware-independent manner. VRM also supports rack-level boot-up sequencing of hardware components and provides services such as secure, remote, hard reset of these components.

In general, VRM manages the physical components of the physical rack, e.g., blade(s) 123 in blade enclosure 120, servers in RMS 130, and the like; and maintains a corresponding software physical rack object. In other words, VRM monitors the hardware health of the switches and hosts and reports each one's health status. Thus, the VMware EVO SDDC system calculates the hardware health state of the resource based on the current set of alerts that the VRM has raised for that hardware resource and the severities of those alerts, including any alerts on the hardware Field Replaceable Units (FRUs) contained within that resource.

In one embodiment, security management manages remoted disks and access to one or more resources in rack 100. Security management may manage access using secure industry authentication schemes.

In one embodiment, performance management matches application performance needs with available infrastructure. Availability management matches application availability requirements for the given application.

Switch networking 110 includes one or more different switch and network devices that allow rack 100 to communicate with different racks, different switches, switches from different manufacturers, racks with different operating systems, and the like. A switch in switch networking 110 may be any of a number of switch types, such as, for example, a management switch, a top of rack (TOR) switch, spine switch, or the like.

Blade enclosure 120 is an enclosure to host one or more blade server(s) 123. Similarly, RMS 130 refers to one or more rack server(s) 133 stored in rack 100. In general, server 133 may be any of a plurality of server types. One example of a server's characteristics may be an Intel x86 based server that contains redundant, multi-gigabit network interfaces, power supplies, as well as a combination of hard drives and solid state drives. Although in FIG. 1A, a specific number of servers, blades, and switches are shown, it should be appreciated that one embodiment of a full rack may include 24 nodes which may be include a number of servers, a number of blades, a number of switches, a number of other components, and the like. Thus, the use of arrangement provided in the diagram and used in the discussion is merely for purposes of clarity.

Discovery

In one embodiment, when a rack such as rack 100 becomes operational a discovery is performed by a management protocol such as VRM. The discovery will determine the amount of one or more resources that are available on rack 100. The discovery can be performed through the VRM in-band management agent or the VRM out-of-band management agent. The one or more resources may include CPU, memory, or storage. The following discussion will focus on the storage, however, it should be understood that the same procedure can be used for any of the other resources of the rack. Moreover, embodiments are also well suited to performing the procedures outlined herein on a plurality of the available rack resources. For example, CPU and storage, memory and storage, CPU and memory, or even all three of CPU, memory, and storage.

During discovery, aspects of the rack such as storage capacity, usage, power state and location of the server or rack will be determined. For example, the VRM will discover the different types of storage devices, such as HDD, SSD, Flash storage and the like. Additionally, the capacity of the different types of storage devices will also be established. In one embodiment, during the discovery, security will be achieved through the secured out-of-band communication using industry standard authentication schemes. Similarly, the CPU and memory aspects of rack 100 can also be determined.

Disaggregation

After discovery, one embodiment will disaggregate the one or more resources in each of the server, and blade and aggregate them to a common pool of shared resources that are similar in nature such as shown in 140 of FIG. 1A where the different storage resources are placed into the different aggregated buckets A, B, and/or C. In one embodiment, only the storage resources would be aggregated while the memory and CPU resources would not be aggregated but would remain as a fixed allocation resource. That is each server assigned to the workload would result in all of the CPU and memory resources of each server being assigned to the workload (e.g., the number of servers in the workload would be determined based on CPU and/or Memory needs) and the storage resources would be taken from the servers assigned and supplemented, as needed, with storage from the aggregated resources bucket.

In another embodiment, only the CPU or memory resources would be aggregated while the other of the memory, storage and CPU resources would not be aggregated but would remain as a fixed allocation resource. That is each server assigned to the workload would result in all of the storage, CPU and/or memory resources of each server being assigned to the workload (e.g., the number of servers in the workload would be determined based on storage, CPU and/or Memory needs) and the storage, and CPU or memory resources would be taken from the servers assigned and supplemented, as needed, with CPU or memory resources from the aggregated resources bucket.

In yet another embodiment, storage and one of the CPU or memory resources would be aggregated while the other of the memory or CPU resources would not be aggregated but would remain as a fixed allocation resource. That is each server assigned to the workload would result in all of the storage, CPU and/or memory resources of each server being assigned to the workload (e.g., the number of servers in the workload would be determined based on storage, CPU and/or Memory needs) and the storage and CPU or memory resources would be taken from the servers assigned and supplemented, as needed, with storage and CPU or memory resources from the aggregated resources buckets.

Figure 1B:
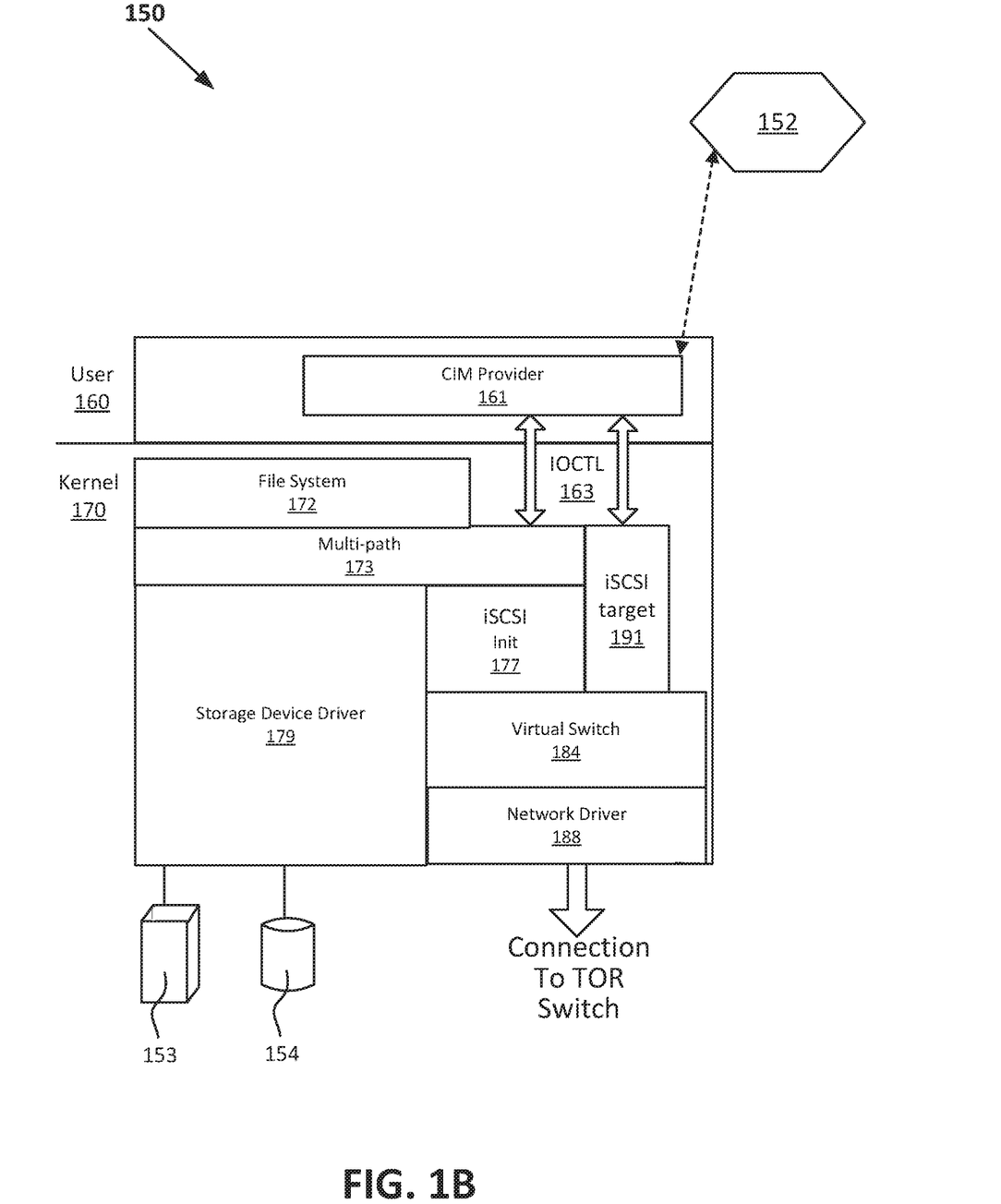
FIG. 1B depicts a block diagram of a hyper converged infrastructure, according to one embodiment.

FIG. 1B depicts a block diagram 150 of a hyper converged infrastructure, according to one embodiment. FIG. 1B includes VRM 152 and the user level 160 and kernel level 170 view of a hyper converged infrastructure. In one embodiment, user level 160 includes a common information model (CIM) provider 161 and input-output control (IOCTL) 163. In general, CIM providers allow management functionality such as reporting health monitoring information or updating driver firmware.

In one embodiment, kernel level 170 includes a number of drivers and plugins such as: file system 172, HCI multi-path plugin 173, and storage device driver 179. In one embodiment, kernel level 170 also includes Internet small computer systems interface (iSCSI) initiator 177, iSCSI target 191, virtual switch 184, and network driver 188. In general, network driver 188 is used to provide a gateway for accessing hardware control functions, and allow the interface to be accessed from a remote system using serial or LAN connections In one embodiment, iSCSI target 191 couples multi-path plugin 173 with virtual switch 184. Moreover, storage device driver 179 is coupled with storage 153 and 154. In one embodiment, the network driver 188 has a connection to the TOR switch 502 (of FIG. 5).

As described in more detail herein, with respect to resource provisioning, in one embodiment, virtual resource manager 152 will get an inventory of local discs using CIM 161. For example, when the hyper converged infrastructure 150 boots up, multi-path plugin 173 will claim all local storage, e.g., 153 and 154 except for the boot drive. If there are local disks, it also brings up an iSCSI target 191 to share the disks with other blades.

In one embodiment, when all the hosts in the rack 150 come up, VRM 152 sends a message to all the hosts that have storage to claim all the disks. The CIM provider 161 accepts the message and issues an IOCTL to the HCI multi-path plugin 173, which will claim all the disks except for the Boot disk. Since the multi-path plugin 173 does not export the disks to LVM/file system, the local ESXi server assumes that there are no disks/storage attached to the server.

In other words, after the local storage is claimed, when a workload domain is created, VRM 152 will instruct multi-path 173 to pass local disks to the server, open up iSCSI targets with credentials and expose the storage disks. At that time, VRM 152 will remotely connect the iSCSI target and the loaned storage disks.

For example, multipath driver 175 with embedded iSCSI target 144 in combination with a CIM provider 161 is used to claim all the local storage. For example, in one embodiment, the storage resources are claimed by a multipath driver that will claim all local storage on rack 100 except for a boot drive.

Thus, one embodiment uses inventory, performance, availability, and security criteria to provide isolated containers for applications while performing resource management to completely utilize all of the resources of the server, blade, or rack 100.

In one embodiment, the VRM or the like will monitor the resource pool and update the resource pool based on changes with the rack. For example, the amount of available storage in the resource pool will be reduced when a server is decommissioned. Similarly, if a server or blade is added or replaced, the amount of available storage in the resource pool will be updated.

Workload Domain Creation

Figure 2:
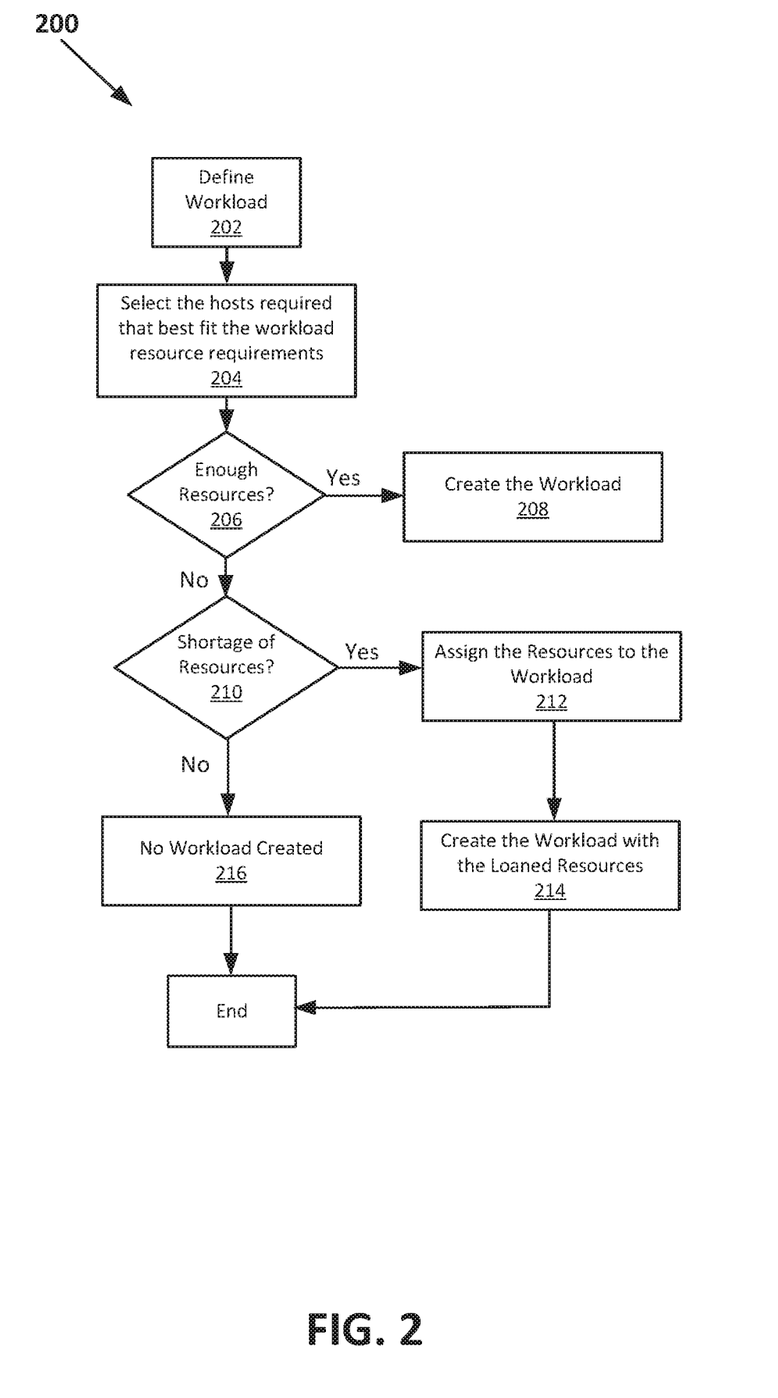
FIG. 2 depicts a flowchart of a method for creating a workload, according to one embodiment.

With reference now to FIG. 2, a flowchart of a method for creating a workload is shown in accordance with an embodiment. For example, in one embodiment, only the storage resources would be aggregated while the memory and CPU resources would not be aggregated but would remain as a fixed allocation resource. That is each server assigned to the workload would result in all of the CPU and memory resources of each server being assigned to the workload (e.g., the number of servers in the workload would be determined based on CPU and/or Memory needs) and the storage resources would be taken from the servers assigned and supplemented, as needed.

At 202, the workload is defined. In general, the workload will include a plurality of resource requirements. One example of workload resource requirements is a CPU capacity 6 GHz, Memory capacity 2 TB, and Storage capacity of 10 TB.

In one embodiment, each server in the rack has a CPU capacity of 2 GHz, a memory capacity of 1 TB and a storage capacity of 3 TB. As such, the workload build without utilizing the present technology would require 4 servers to be assigned to the workload. Thus, the best fit workload of four servers would have a CPU capacity of 8 GHz, a memory capacity of 4 TB and a storage capacity of 12 TB which is significantly more than what is required by the actual workload specifications.

In contrast, by using the present technology, significant resources can be saved and properly utilized. In one embodiment, the resource management would look at the application requirements, e.g., performance, availability, security, capacity, and the like.

At 204, one embodiment selects the hosts required that best fit the workload resource requirements. For example, in one embodiment, resource management would assign three servers to the workload.

At 206, one embodiment determines if enough resources have been allocated to the workload. At 208, if the allocated resources are enough then the workload is created.

However, if enough resources are not allocated then 210 determines if there are available resources in the resource pool to cover the shortcomings. For example, the resource management would then look at the resource pool for additional storage disks that also meet the application requirements.

If resources that meet the application requirements are not found, then at 216, the workload is not created.

However, if resources are found that meet the application requirements, then at 212, the resources are assigned to the workload in the hyper converged infrastructure.

At 214, the workload with loaned resources is created. In one embodiment, the assignment occurs by passing the login and credentials for the storage from the resource pool to the CIM provides which will push the details to the multi path module to create a secure channel between the client and the server. For example, when a workload domain is created, the virtual resource management will instruct the multi path plugin (MPP) to pass local disks to the server; open up ISCSI target 144 with credentials and expose the disks; and remotely connect rack 100 to iSCSI Target 144 and then loan the disks.

Thus, the resultant workload of a 6 GHz capacity CPU (which can be pooled with 3 server nodes), a 2 TB capacity memory (which can be pooled with 3 server nodes) and a 10 TB storage capacity (the 3 servers pooled capacity maximum is 8 TB plus the 2 TB allocated to create the IAAS workload).

Availability

In one embodiment, a workload may have availability requirements that require an operational workload even if one server or blade goes down, is decommissioned due to hardware failure, or the like. In such an instance, even if the workload requirements are within the capacity of a single server or blade, the workload will be built from the resource pool to spread the workload across multiple servers, blades, or racks. Similarly, if the workload requirements are within the capacity of a single rack, the workload can be spread across multiple racks to maintain the availability requirement.

Performance

Figure 3:
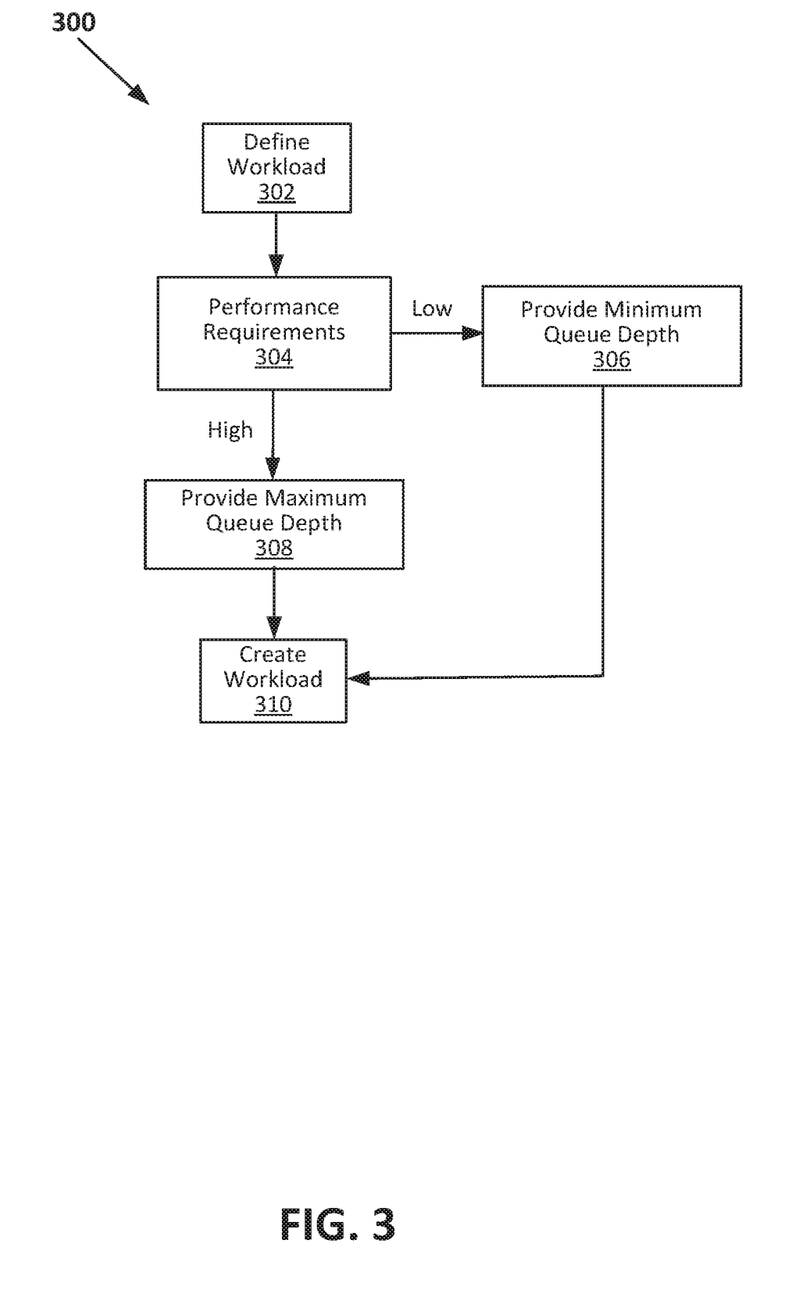
FIG. 3 depicts a flowchart for selection of queue depth capacity, according to one embodiment.

With reference now to FIG. 3, a flowchart for selection of queue depth capacity is shown in accordance with an embodiment. In one embodiment, the resources are connected to a host bus adapter (HBA). Each adapter has a queue depth value which is the maximum number of kernel active commands that the adapter driver is configured to support. In one embodiment, the HBA can take up to 64 commands at a time. Thus, if there are 8 storage devices connected and controlled by the HBA, each storage device can issue up to 8 commands (64/8). However, instead of evenly dividing the 64 commands between the 8 storage devices, one embodiment may allocate the commands based on performance requirements of the workload. The iSCSI target configured as part of 0042, will be instructed to limit the queue depth to the device At 302 the workload is defined based on application requirements.

Referring now to 304, one embodiment evaluates the performance requirements of the workload. At 306, in low performance required workload domains, like test and development workloads, the resources may only be given a 4 queue depth value. In contrast, at 308, in high performance required workload domains, like production workloads, the resources may be given up to 12 queue depth value/capacity.

At 310 the workload is created. Thus, in one embodiment, different levels of performance are achieved by providing the maximum queue depth capacity of the adapter to workloads with high performance requirements while providing minimum queue depth values to workloads with low performance requirements.

Figure 4:
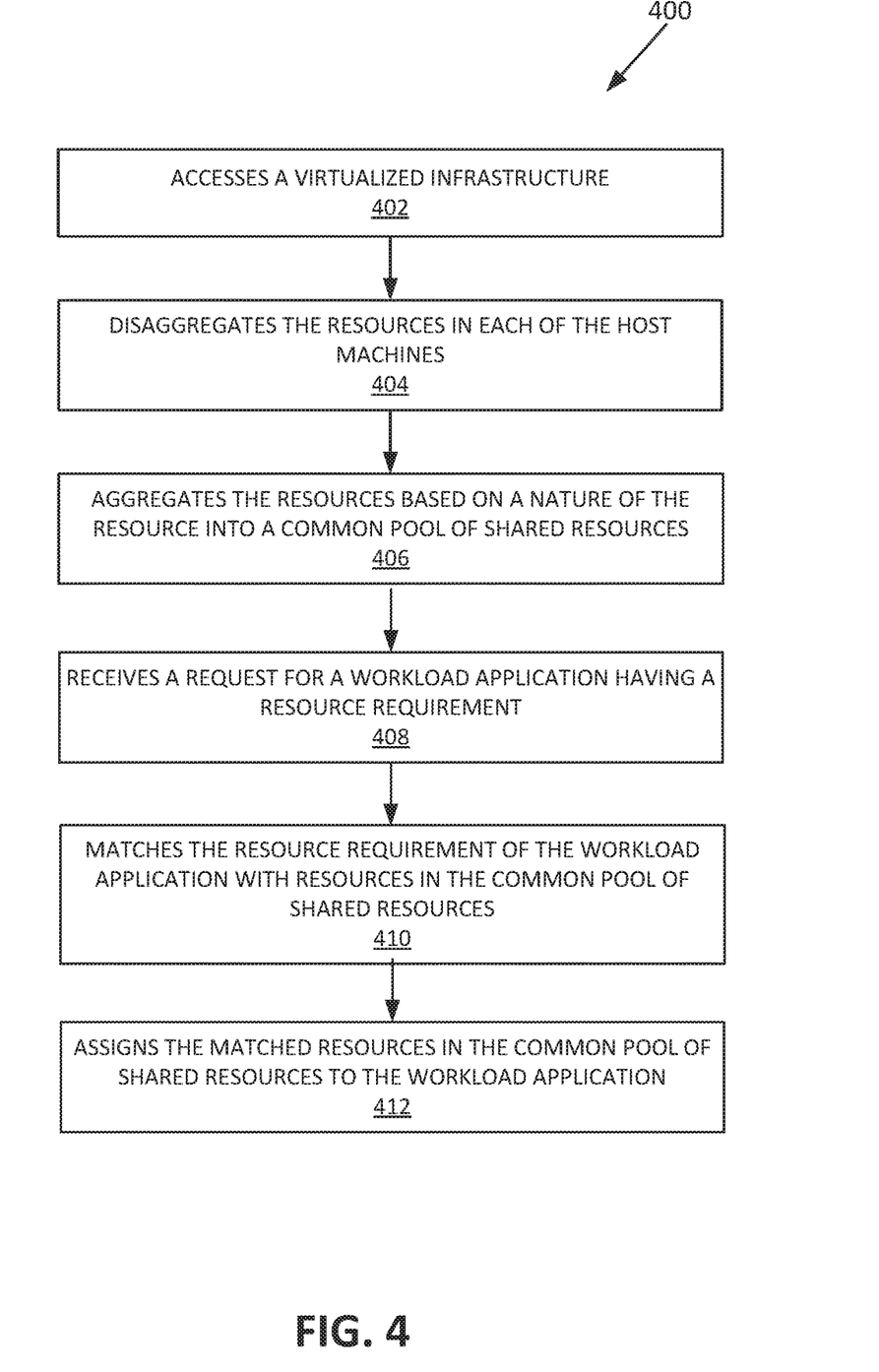
FIG. 4 depicts a flowchart of a method for distributed resource management in a hyper converged infrastructure, according to one embodiment.

With reference now to FIG. 4, a flowchart of a method for distributed resource management in a hyper converged infrastructure is shown in accordance with an embodiment. In one embodiment, the distributed resource management is a distributed storage resource management and the common pool of shared resources is a common pool of shared storage resources. In another embodiment, the distributed resource management is a distributed memory resource management and the common pool of shared resources is a common pool of shared memory resources. In yet another embodiment, the distributed resource management is a distributed CPU resource management and the common pool of shared resources is a common pool of shared CPU resources. In yet another embodiment, the distributed resource management is a distributed storage, CPU, and/or memory resource management and the common pool of shared resources is a common pool of shared storage, CPU, and/or memory resources.

Referring now to 402 of FIG. 4, one embodiment accesses a virtualized infrastructure. In one embodiment the virtualized infrastructure includes a plurality of host machines, each of the plurality of host machines having resources. The resources include a central processing unit (CPU), a memory, and a storage, such as shown in rack 100 of FIG. 1A. In one embodiment, each of the plurality of host machines are communicatively coupled with one or more virtual machines.

With reference now to 404 of FIG. 4, one embodiment disaggregates the resources in each of the host machines. In one embodiment, disaggregating the resources in each of the host machines is performed discovering the resources available across a rack of host machines (e.g., servers, blades, and the like). In one embodiment, the discovering is performed by the VRM acting as an out-of-band management agent. In another embodiment, the discovering is performed by the VRM acting as an in-band management agent.

In one embodiment, the discovering of the resources available across a rack of host machines includes, but is not limited to, one or more of, discovering a capacity of the resources, discovering a usage of the resources, discovering a power state of the resources; discovering a location of the host machines maintaining the resources, and the like.

Referring now to 406 of FIG. 4, one embodiment aggregates the resources based on a nature of the resource into a common pool of shared resources.

With reference now to 408 of FIG. 4, one embodiment receives a request for a workload application having a resource requirement.

Referring now to 410 of FIG. 4, one embodiment matches the resource requirement of the workload application with resources in the common pool of shared resources. One embodiment spreads the matching of the resource requirement of the workload application across resources on multiple host machines to reduce loss due to a host machine loss.

With reference now to 412 of FIG. 4, one embodiment assigns the matched resources in the common pool of shared resources to the workload application. In one embodiment, the plurality of host machines are communicatively coupled via a host bus adapter and a four queue depth capacity value is utilized for the host bust adapter when the workload application has a low performance requirement. In contrast, up to a twelve queue depth capacity value is utilized for the host bust adapter when the workload application has a high performance requirement.

Although four and twelve are utilized herein in the example when the two resources are sharing a capacity of 16, it should be appreciated that the actual depth capacity may be different. For example, when a number of devices are utilizing the host adapter a low performance requirement may result in a queue depth less than or equal to half of the actual host bus adapter queue depth capacity while a high performance requirement may result in a queue depth greater than or equal to half of the actual host bus adapter queue depth capacity.

Figure 5:
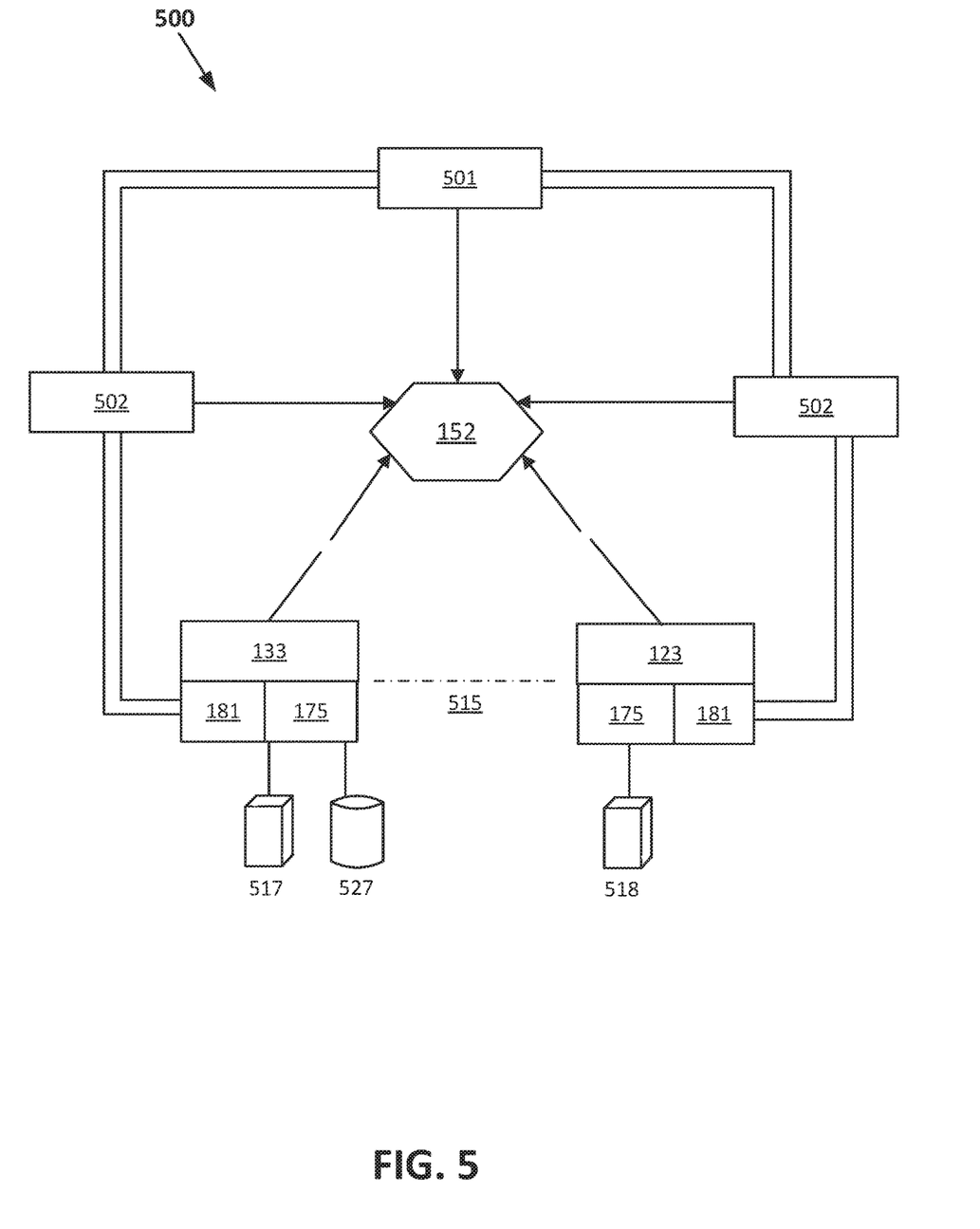
FIG. 5 depicts a block diagram of a hyper converged infrastructure discovery phase, according to one embodiment.

With reference now to FIG. 5, a block diagram of an example of a hyper converged infrastructure discovery phase, according to one embodiment. During the discovery phase, a spine switch 501 and TOR switches 502 fetch network information and provide it to VRM 152. Then network information may include network details such as make, model, ports, speed, and the like; uplink port details, and end to end topology of the network.

VRM 152 will also fetch server information from a server pool 515 which, in one embodiment, includes rack server 133 and blade server 123. In one embodiment, rack server 133 and blade server 123 include a NIC 181 and HBA 175 and storage such as solid state drives 517 and 518, and magnetic disk 527.

The fetched server information can include server details such as make, model, CPU, memory, and the like. The fetched information will also include HBA 175 queue depth, speed, and number of disks connected. The fetched information also includes disk information, e.g., type (SSD/MD), capacity, speed, etc. The fetched information additionally includes NIC speed, neighboring port (e.g., topology) and the like.

Thus, at the end of discovery phase, VRM 152 gets inventory of the hardware (including the Server and Switch), Network and Storage Resource Details including the Queue Depth, Capacity, Speed, Bandwidth and the end to end topology Details. The inventory details are valuable to setup the workload domain with the requested Performance, Availability and Security Characteristics.

Figure 6:
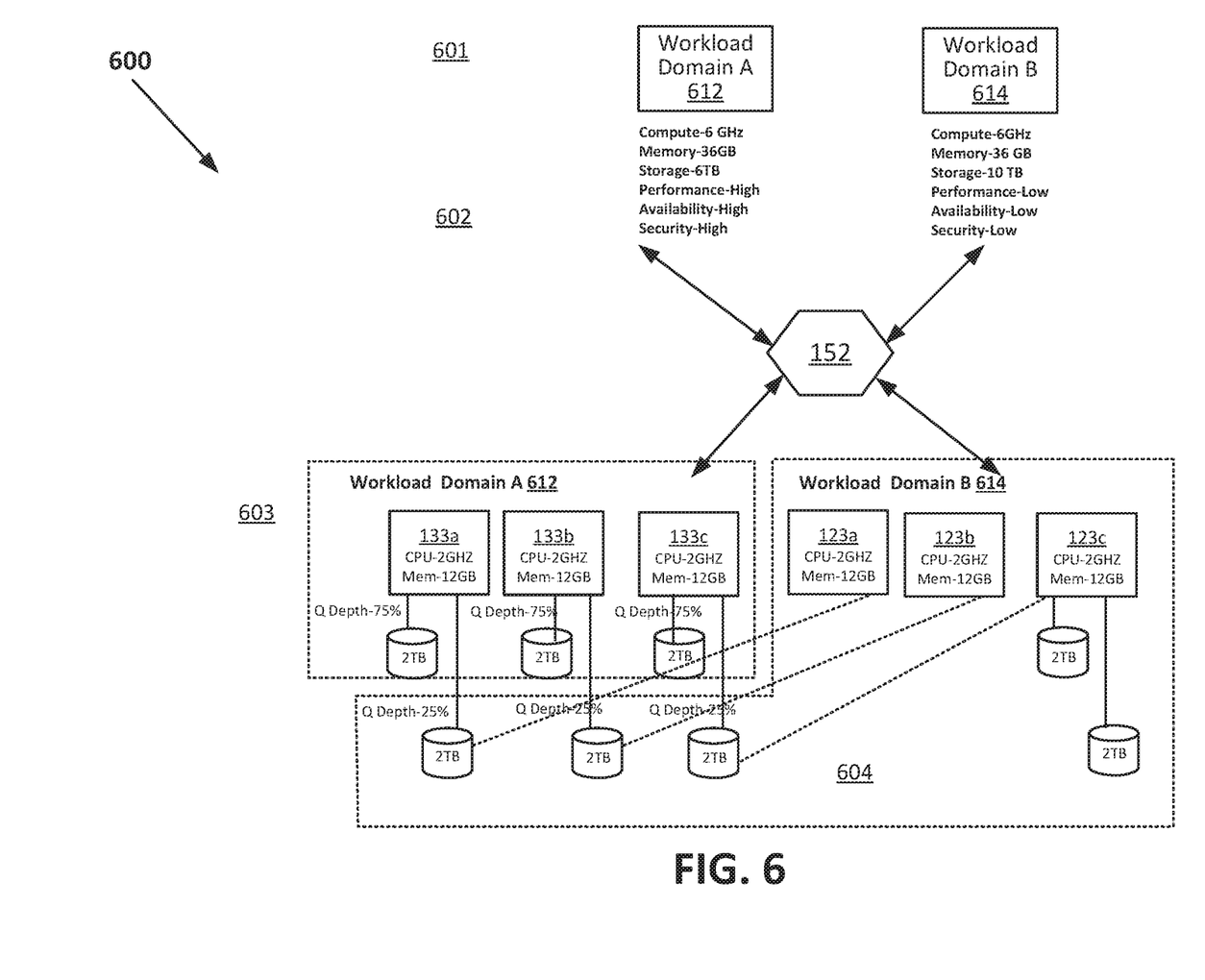
FIG. 6 depicts a block diagram of a resource management workload domain, according to one embodiment.

Referring now to FIG. 6, a block diagram 600 of an exemplary resource management workload domain is shown according to one embodiment. Although only two workload domains 612 and 614 are shown, it should be appreciated that there may be more or fewer. The use of two herein is merely for purposes of clarity.

At 601, the application requirements are established. In one embodiment, a user inputs the application requirements. For example, in workload domain A 612, the application requirements are compute 6 GHz, Memory 36 GB, storage 6 TB, performance—high, availability—high, and security—high. In workload domain B 614, the application requirements are compute 6 GHz, Memory 36 GB, storage 10 TB, performance—low, availability—low, and security—low.

At 602, VRM 152 translates the application requirements to physical infrastructure requirements.

At 603, VRM 152 selects servers 133a-133c for workload A 612 based on the physical infrastructure needs. Further VRM 152 requests the multi-path plugin to only expose the required storage to workload domain. The remaining storage is still in the inventory.

At 604, VRM 152 selects the available servers 123a-123c for workload B 614. Since storage is low, VRM 152 loans the storage from servers 133a-133c in workload domain A 612. VRM 152 sets up the target name and credentials so that the iSCSI initiators in Workload Domain B 614 can securely access storage in workload domain A 612. VRM 152 then maps the outstanding commands in an iSCSI session to available queue depth on the storage adapter of servers 133a-133c in the workload domain A 612 (25% in the above example). As such, the disks appear as local to servers 123a-123c in workload domain B 614.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor of the computer system or physical computer. When executed, the instructions cause a computer system (physical computer) to implement the functionality of various embodiments of the present invention. For example, the instructions can be executed by a central processing unit associated with the computer system (physical computer). A central processing unit is an example of a hardware processor. According to one embodiment, the non-transitory computer readable storage medium is tangible. The non-transitory computer readable storage medium is hardware memory.

Unless otherwise specified, one or more of the various embodiments described in the context of FIGS. 1-2 can be implemented as hardware, such as circuitry, firmware, or computer readable instructions that are stored on non-transitory computer readable storage medium. The computer readable instructions of the various embodiments described in the context of FIGS. 1A-2 can be executed by a hardware processor, such as central processing unit, to cause a computer system to implement the functionality of various embodiments. For example, according to one embodiment, the operations of the flowcharts depicted in FIG. 2 are implemented with computer readable instructions that are stored on computer readable storage medium that can be tangible or non-transitory or a combination thereof.

Example Computer System Environment

Figure 7:
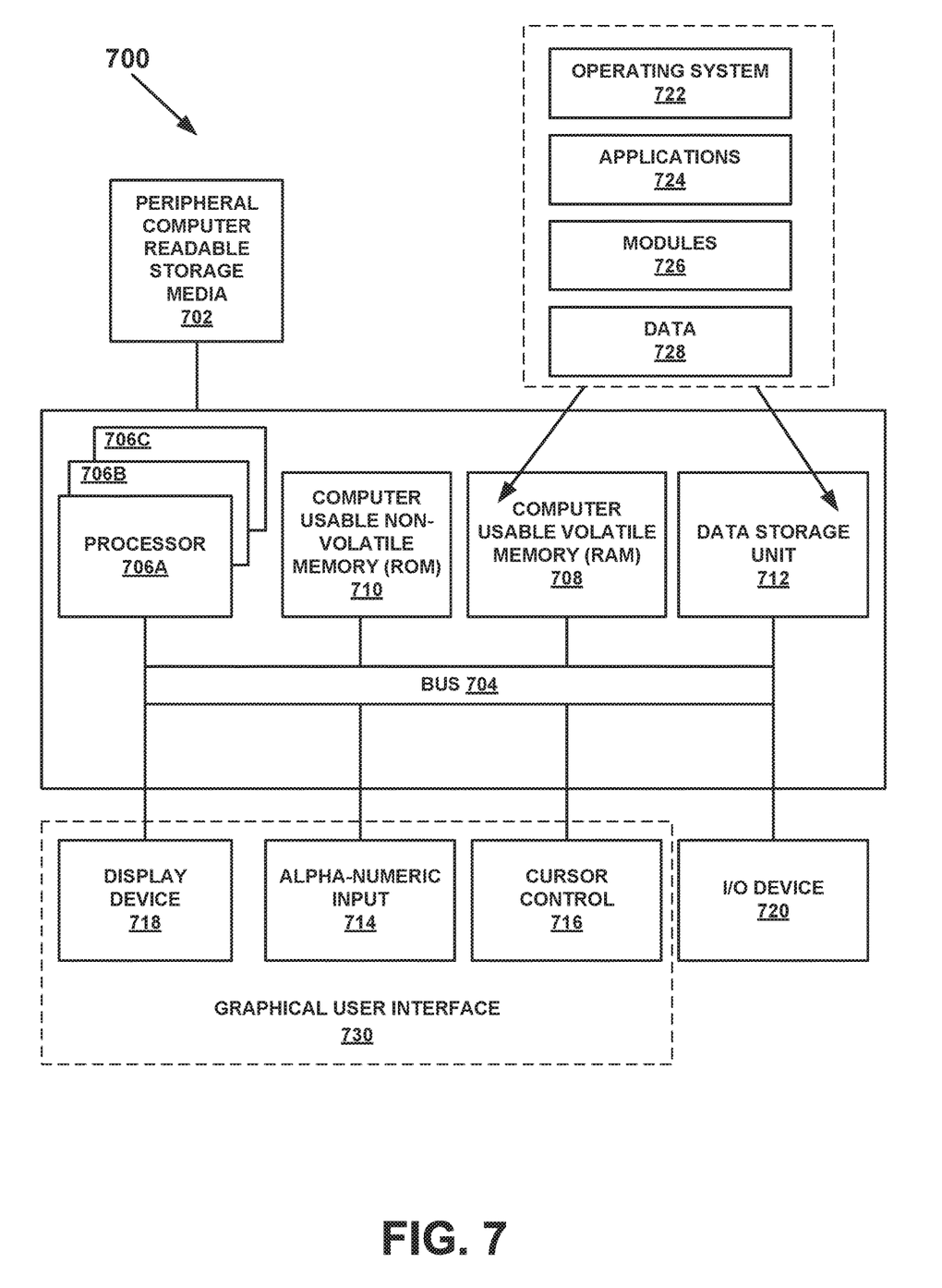
FIG. 7 depicts a block diagram of a computer system, according to one embodiment.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 700) that can be used in accordance with or to implement various embodiments which are discussed herein. It is appreciated that computer system 700 of FIG. 7 is only an example and that embodiments as described herein can operate on or within a number of different computer systems including, but not limited to, general purpose networked computer systems, embedded computer systems, routers, switches, server devices, client devices, various intermediate devices/nodes, stand-alone computer systems, media centers, handheld computer systems, multi-media devices, virtual machines, virtualization management servers, and the like. Computer system 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 700 of FIG. 7 includes an address/data bus 704 for communicating information, and a processor 706A coupled with bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g., random access memory (RAM), coupled with bus 704 for storing information and instructions for processors 706A, 706B, and 706C. System 700 also includes computer usable non-volatile memory 710, e.g., read only memory (ROM), coupled with bus 704 for storing static information and instructions for processors 706A, 706B, and 706C. Also present in system 700 is a data storage unit 712 (e.g., a magnetic or optical disc and disc drive) coupled with bus 704 for storing information and instructions. System 700 also includes an alphanumeric input device 714 including alphanumeric and function keys coupled with bus 704 for communicating information and command selections to processor 706A or processors 706A, 706B, and 706C. System 700 also includes an cursor control device 716 coupled with bus 704 for communicating user input information and command selections to processor 706A or processors 706A, 706B, and 706C. In one embodiment, system 700 also includes a display device 718 coupled with bus 704 for displaying information.

Referring still to FIG. 7, display device 718 of FIG. 7 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. System 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with system 700 through graphical representations presented on display device 718 by interacting with alpha-numeric input device 714 and/or cursor control device 716.

System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

Although various illustrations were described in the context of VMware® products, such as VRM and VMware EVO SDDC rack, various embodiments are well suited for other types of products where, for example, a management system is managing a computing rack that is other than a VMware EVO SDDC rack.

According to various embodiments, the distributed resource management of a VMware EVO SDDC multi-rack significantly increases the employability of components within the rack, reduces waste, and increases efficiency and versatility of the hyper converged infrastructure. Therefore, the state of a computer system is transformed at least by the utilization of the distributed resource management, according to one embodiment. Moreover, the overall operation, employability and scaling of the hyper converged infrastructure are significantly improved by the utilization of the distributed resource management described herein.

Although specific operations are disclosed in flowcharts 200-400, such operations are exemplary. That is, embodiments of the present invention are well suited to performing various other operations or variations of the operations recited in flowcharts 200-400. It is appreciated that the operations in flowcharts 200-400 may be performed in an order different than presented, and that not all of the operations in flowcharts 200-400 may be performed.

The operations depicted in FIGS. 2-4 can be implemented as computer readable instructions, hardware or firmware. According to one embodiment, a computer system 700 can perform one or more of the operations depicted in FIGS. 2-4. According to one embodiment, one or more of the operations depicted in FIGS. 2-4 may be performed by another computer system. The other system can include hardware, such as a central processing unit, for executing computer readable instructions.

What is claimed is:

1. A method for distributed resource management in a hyper converged infrastructure, the method comprising:
   accessing a virtualized infrastructure;
   disaggregating resources in each of more than one host machines;

aggregating the resources based on a nature of the resource into a common pool of shared resources;

receiving a request for a workload application having a resource requirement;

matching the resource requirement of the workload application with resources in the common pool of shared resources;

assigning the matched resources in the common pool of shared resources to the workload application; and spreading the matching of the resource requirement of the workload application across resources on multiple host machines to reduce loss due to a host machine loss.

2. The method as recited by claim 1, wherein the distributed resource management is a distributed storage resource management and the common pool of shared resources is a common pool of shared storage resources.

3. The method as recited by claim 1, wherein the distributed resource management is a distributed memory resource management and the common pool of shared resources is a common pool of shared memory resources.

4. The method as recited by claim 1, wherein the distributed resource management is a distributed CPU resource management and the common pool of shared resources is a common pool of shared CPU resources.

5. The method as recited by claim 1, wherein the plurality of host machines are communicatively coupled via a host bus adapter, the method further comprising:

utilizing a four queue depth capacity value for the host bust adapter when the workload application has a low performance requirement.

6. The method as recited by claim 1, wherein the plurality of host machines are communicatively coupled via a host bus adapter, the method further comprising:

utilizing a twelve queue depth capacity value for the host bust adapter when the workload application has a high performance requirement.

7. The method as recited by claim 1, wherein disaggregating the resources in each of the host machines comprises:

discovering the resources available across a rack of host machines, the discovering performed by a virtual resource manager (VRM) acting as an out-of-band management agent.

8. The method as recited by claim 7, wherein discovering the resources available across a rack of host machines further comprises:

discovering a capacity of said resources;

discovering a usage of said resources;

discovering a power state of said resources; and discovering a location of the host machines maintaining the resources.

9. A non-transitory computer-readable medium storing instructions, the instructions comprising:

one or more instructions that, when executed by one or more processors of a device, cause the one or more processors to:

access a virtualized infrastructure;

disaggregate resources in each of more than one host machines;

aggregate the resources based on a nature of the resource into a common pool of shared resources;

receive a request for a workload application having a resource requirement;

match the resource requirement of the workload application with resources in the common pool of shared resources; and assign the matched resources in the common pool of shared resources to the workload application; and spread the matching of the resource requirement of the workload application across resources on multiple host machines to reduce loss due to a host machine loss.

10. The non-transitory computer-readable medium of claim 9, wherein the plurality of host machines are communicatively coupled via a host bus adapter, a method further comprising one or more instructions that, when executed by one or more processors, cause the one or more processors to:

utilize a four queue depth capacity value for the host bust adapter when the workload application has a low performance requirement.

11. The non-transitory computer-readable medium of claim 9, wherein the plurality of host machines are communicatively coupled via a host bus adapter, a method further comprising one or more instructions that, when executed by one or more processors, cause the one or more processors to:

utilizing a twelve queue depth capacity value for the host bust adapter when the workload application has a high performance requirement.

12. The non-transitory computer-readable medium of claim 9, further comprising one or more instructions that, when executed by one or more processors, cause the one or more processors to:

discover the resources available across a rack of host machines, the discovering performed by a virtual resource manager (VRM) acting as an out-of-band management agent.

13. The non-transitory computer-readable medium of claim 9, wherein the common pool of shared resources is selected from two or more of a group consisting of:

a common pool of shared storage resources, a common pool of shared memory resources, and a common pool of shared CPU resources.

14. A non-transitory computer readable storage medium having computer readable program code embedded therein that when executed causes a computing system to perform a method for distributed resource management in a hyper converged infrastructure, the method comprising:

accessing a virtualized infrastructure;

disaggregating resources in each of more than one host machines;

aggregating the resources based on a nature of the resource into a plurality of common pools of shared resources;

receiving a request for a workload application having a resource requirement;

matching the resource requirement of the workload application with resources in the plurality of common pools of shared resources;

assigning the matched resources in the plurality of common pools of shared resources to the workload application; and spreading the matching of the resource requirement of the workload application across resources on multiple host machines to reduce loss due to a host machine loss.

15. The non-transitory computer readable storage medium as recited by claim 14, wherein the plurality of host machines are communicatively coupled via a host bus adapter, the method further comprising:

utilizing a four queue depth capacity value for the host bust adapter when the workload application has a low performance requirement; and utilizing a twelve queue depth capacity value for the host bust adapter when the workload application has a high performance requirement.

16. The non-transitory computer readable storage medium as recited by claim 14, wherein disaggregating the resources in each of the host machines comprises:
discovering the resources available across a rack of host machines,
the discovering performed by a virtual resource manager (VRM) acting as an out-of-band management agent.

17. The non-transitory computer readable storage medium as recited by claim 14, wherein the common pools of shared resources are selected from two or more of a group consisting of:
a common pool of shared storage resources,
a common pool of shared memory resources, and
a common pool of shared CPU resources.

* * * * *